(12) United States Patent
Hioda (10) Patent No.: US 10,988,101 B2
(45) Date of Patent: Apr. 27, 2021

(54) VEHICLE SIDE AIRBAG DEVICE

(71) Applicant: TOYOTA JIDOSHA KABUSHIKI KAISHA, Toyota (JP)

(72) Inventor: Seiji Hioda, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/201,051

(22) Filed: Nov. 27, 2018

(65) Prior Publication Data

US 2019/0193667 A1 Jun. 27, 2019

(30) Foreign Application Priority Data

Dec. 22, 2017 (JP) .............................. JP2017-246555

(51) Int. Cl.
*B60R 21/233* (2006.01)
*B60R 21/207* (2006.01)
*B60R 21/231* (2011.01)

(52) U.S. Cl.
CPC .......... *B60R 21/233* (2013.01); *B60R 21/207* (2013.01); *B60R 21/23138* (2013.01); *B60R 2021/23146* (2013.01); *B60R 2021/23324* (2013.01)

(58) Field of Classification Search
CPC ................ B60R 21/233; B60R 21/207; B60R 21/23138; B60R 2021/23146; B60R 2021/23324
USPC ...................................................... 280/730.2
See application file for complete search history.

(56) References Cited

U.S. PATENT DOCUMENTS

| | | | | |
|---|---|---|---|---|
| 6,851,706 B2* | 2/2005 | Roberts | ............. | B60R 21/23138 280/730.1 |
| 8,480,128 B2* | 7/2013 | Fukawatase | ...... | B60R 21/23138 280/743.1 |
| 8,651,515 B2* | 2/2014 | Baba | ..................... | B60R 21/233 280/729 |
| 9,027,957 B2* | 5/2015 | Baba | ................. | B60R 21/23138 280/729 |
| 9,873,400 B2* | 1/2018 | Scherr | ............... | B60R 21/23138 |
| 10,336,283 B2* | 7/2019 | Rickenbach | .......... | B60R 21/233 |
| 2010/0295277 A1* | 11/2010 | Ochiai | .............. | B60R 21/23138 280/729 |
| 2011/0012330 A1* | 1/2011 | Sato | .................. | B60R 21/23138 280/730.2 |
| 2012/0200072 A1* | 8/2012 | Fukawatase | ...... | B60R 21/23138 280/741 |

(Continued)

FOREIGN PATENT DOCUMENTS

| | | |
|---|---|---|
| JP | H09-039710 A | 2/1997 |
| JP | 2011-020502 A | 2/2011 |

(Continued)

*Primary Examiner* — Ruth Ilan
*Assistant Examiner* — Hilary L Johns
(74) *Attorney, Agent, or Firm* — Oliff PLC (57) ABSTRACT

A vehicle side airbag device is stored inside a seatback of a vehicle seat and includes an airbag that inflates and deploys between a seated occupant and a side door. The interior of the airbag is partitioned into plural chambers including a high-pressure chamber, and the high-pressure chamber inflates and deploys so as to vertically straddle a door beltline as seen in vehicle lateral view and so as to restrain a shoulder region of the seated occupant.

4 Claims, 4 Drawing Sheets

(56) References Cited

U.S. PATENT DOCUMENTS

| | | | | |
|---|---|---|---|---|
| 2012/0217730 A1* | 8/2012 | Baba | ............... | B60R 21/23138 |
| | | | | 280/729 |
| 2014/0239618 A1* | 8/2014 | Katsumata | ........ | B60R 21/23138 |
| | | | | 280/728.3 |
| 2015/0158453 A1 | 6/2015 | Fujiwara | | |
| 2015/0314748 A1* | 11/2015 | Mihm | ............... | B60R 21/2338 |
| | | | | 280/730.2 |
| 2016/0114756 A1* | 4/2016 | Fujiwara | ......... | B60R 21/23138 |
| | | | | 280/729 |
| 2016/0167616 A1* | 6/2016 | Wiik | ................. | B60R 21/207 |
| | | | | 280/729 |
| 2019/0061675 A1* | 2/2019 | Kwon | ................ | B60R 21/233 |
| 2019/0061676 A1* | 2/2019 | Kwon | ................ | B60R 21/233 |
| 2019/0143930 A1* | 5/2019 | Hioda | ................ | B60R 21/233 |
| | | | | 280/730.2 |

FOREIGN PATENT DOCUMENTS

| | | |
|---|---|---|
| JP | 2015-104987 A | 6/2015 |
| JP | 2015-110373 A | 6/2015 |

\* cited by examiner

FIG.3

VEHICLE SIDE AIRBAG DEVICE

CROSS-REFERENCE TO RELATED APPLICATION

This application claims priority under 35 USC 119 from Japanese Patent application No. 2017-246555 filed on Dec. 22, 2017, the disclosure of which is incorporated by reference herein in its entirety.

BACKGROUND

Technical Field

The present disclosure relates to a vehicle side airbag device.

Related Art

A vehicle side airbag device that is stored inside the seatback of a vehicle seat and that is provided with an airbag that inflates and deploys between a seated occupant and a side door at a time of side impact, is known.

However, in a case in which a side airbag device is applied to a vehicle in which the side door beltline is lower than a shoulder region of a seated occupant, there are the following problems. Namely, since the occupant shoulder region is positioned above the door trim, there is a possibility that a portion of the side airbag that restrains the shoulder region (shoulder region restraint portion) cannot obtain a reaction force from the door trim and the occupant shoulder region cannot be appropriately restrained.

Here, the vehicle side airbag device that is disclosed in Japanese Patent Application Laid-open No. 2015-104987 is configured such that the shoulder region restraint portion obtains a reaction force from the side door glass and/or the colliding object, by providing a second airbag, communicated via a communication hole in a partition fabric, at the side door side of an upper part of a first airbag.

However, in the device of Japanese Patent Application Laid-open No. 2015-104987, since the configuration is designed to obtain a reaction force from the side door glass and/or the colliding object, there is the risk that an appropriate reaction force cannot be obtained in cases in which the side door glass breaks or owing to the specific manner of impact of the colliding object, for example.

SUMMARY

The present disclosure takes the foregoing circumstances into consideration. That is, the present disclosure aims to provide a vehicle side airbag device that can appropriately restrain an occupant shoulder region at a time of side impact even in a case in which the door beltline is lower than the shoulder region of the seated occupant.

Means for Solving the Problem

The vehicle side airbag device according to a first aspect is stored inside a seatback of a vehicle seat and includes an airbag that inflates and deploys between a seated occupant and a side door, an interior of the airbag being partitioned into plural chambers including a high-pressure chamber, and the high-pressure chamber inflating and deploying so as to vertically straddle a door beltline as seen in vehicle lateral view and so as to restrain a shoulder region of the seated occupant.

In the vehicle side airbag device according to the first aspect, an airbag is stored inside the seatback of a vehicle seat. This airbag inflates and deploys between the seated occupant and the side door.

In addition, the interior of the airbag is partitioned into plural chambers. Further, a high-pressure chamber, which is one of the plural chambers, inflates and deploys so as to vertically straddle a door beltline as seen in vehicle lateral view. As a result, the high-pressure chamber receives a reaction force from the door trim at a portion below the door beltline. Since the high-pressure chamber has high internal pressure, the high-pressure chamber can easily stand upright owing to a reaction force received from a cabin interior-side lateral face (door trim) of the side door. Further, the shoulder region of the seated occupant is restrained by this upright high-pressure chamber. Therefore, with the vehicle side airbag device according to the first aspect, the occupant shoulder region can be appropriately restrained at a time of side impact even in a vehicle in which the door beltline is lower than the shoulder region of the seated occupant.

The vehicle side airbag device according to a second aspect is configured such that the airbag according to the first aspect has an increased thickness toward an outer side in a vehicle width direction at a position at which the airbag restrains the shoulder region of the seated occupant.

In the vehicle side airbag device according to the second aspect, the thickness of the airbag is increased toward an outer side in a vehicle width direction at a position at which the airbag restrains the shoulder region of the seated occupant. As a result, the portion of the airbag that restrains the shoulder region of the seated occupant can directly receive a reaction force from the side door glass and/or the colliding object at the portion having increased thickness.

The vehicle side airbag device according to a third aspect is configured such that an inflator is disposed inside the high-pressure chamber according to the first aspect or second aspect.

In the vehicle side airbag device according to the third aspect, an inflator is disposed inside the high-pressure chamber. As a result, compared to a configuration in which gas is supplied to the high-pressure chamber from the inflator via a diffuser or the like, the high-pressure chamber, which inflates and deploys so as to restrain the shoulder region of the seated occupant, inflates and deploys promptly. As a result of this, the occupant shoulder region can be restrained even more appropriately.

The vehicle side airbag device according to a fourth aspect is configured such that the high-pressure chamber according to any one of the first to third aspects extends as far as a lower end part of the airbag.

In the vehicle side airbag device according to the fourth aspect, the high-pressure chamber extends as far as a lower end part of the airbag. As a result, the high-pressure chamber can obtain a reaction force from the door trim at a region that is long in a vertical direction, and the high-pressure chamber can easily stand upright.

The vehicle side airbag device according to a fifth aspect is configured such that the high-pressure chamber according to any one of the first to fourth aspects expands further toward the front of the vehicle at a height position corresponding to the shoulder region of the seated occupant than at a height position corresponding to a lumbar region of the seated occupant.

In the vehicle side airbag device according to the fifth aspect, the high-pressure chamber expands further toward the front of the vehicle at a height position corresponding to the shoulder region of the seated occupant than at a height position corresponding to the lumbar region of the seated occupant. As a result, the internal pressure of the high-pressure chamber can be secured without increasing the volume of the high-pressure chamber at a height position corresponding to the lumbar region of the seated occupant, and in addition, the shoulder region of the seated occupant can be restrained by the high-pressure chamber with high accuracy.

Effect of the Invention

As explained above, according to the present disclosure, the occupant shoulder region can be appropriately restrained at a time of side impact even in a case in which the door beltline is lower than the shoulder region of the seated occupant.

DETAILED DESCRIPTION

First Exemplary Embodiment

In the following, side airbag device 20 according to a first exemplary embodiment is explained using FIGS. 1 and 2.

It should be noted that the arrow FR, the arrow UP and the arrow OUT, which are indicated as appropriate in the respective drawings, indicate a forward direction of the vehicle (direction of travel), an upward direction, and an outer side in a vehicle width direction, respectively. In the following, in the case of explanation simply using front and rear, left and right, and upward and downward directions, unless otherwise noted, these indicate the front and rear in a vehicle front-rear direction, the left and right in a vehicle left-right direction (vehicle width direction), and upward and downward in a vehicle vertical direction.

Figure 1:
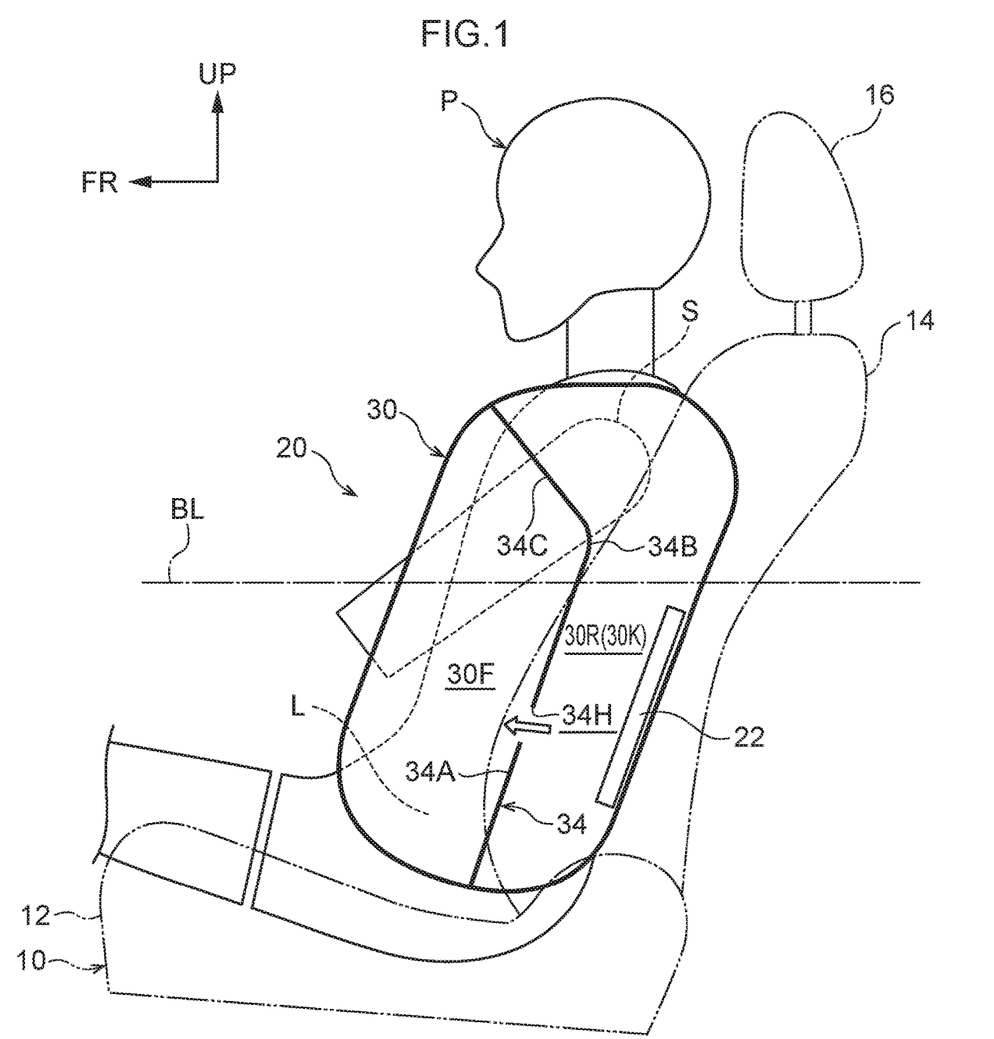
FIG. 1 is a schematic lateral view indicating an airbag device according to a first exemplary embodiment in a state in which an airbag is inflated and deployed.

As shown in FIG. 1, vehicle seat 10 is provided with seat cushion 12, seatback 14, which is reclineably coupled to a rear end part of seat cushion 12, and headrest 16, which is coupled to an upper end part of seatback 14. Side airbag device 20 is provided inside seatback 14 of vehicle seat 10 (specifically, inside a side support part configuring a side portion of seatback 14).

Vehicle seat 10 is the driver's seat in a left-hand drive vehicle or the front passenger seat in a right-hand drive vehicle, and is disposed at the left-hand side inside the vehicle cabin. The front-rear direction, left-right direction (width direction) and vertical direction of this vehicle seat 10 coincide with the front-rear direction, left-right direction (width direction), and vertical direction of the vehicle.

Further, in the respective drawings, crash test dummy P is shown in a seated state in vehicle seat 10. Dummy P is an AM50 (American adult male, 50th percentile) World Side Impact Dummy (WorldSID). Dummy P is seated in vehicle seat 10 using a seating method prescribed for side impact testing methods, and the front-rear position of seat cushion 12 relative to the vehicle and the angle of inclination of seatback 14 relative to seat cushion 12 are adjusted to standard setting positions in accordance with the above-noted seating method. In the following, dummy P is also referred to as occupant P.

Seatback 14 of vehicle seat 10 is provided with a seatback frame (omitted from the drawings), a seatback pad (omitted from the drawings) covering the seatback frame, and a seatback surface skin covering the seatback pad (in FIG. 1, the seat surface skin including the seatback surface skin—that is, the peripheral shape of vehicle seat 10—is shown by a dashed-double dotted line).

Side airbag device 20 is configured by airbag 30, which is formed as a bag body and is folded up, and inflator 22, which inflates and deploys the folded airbag 30 by producing gas. Inflator 22 is cylindrical in form, and is fixed to an outer side in the vehicle width direction of the seatback frame with the longitudinal direction of inflator 22 aligned with the vertical direction of seatback 14 (a direction linking the position at which seatback 14 is coupled to seat cushion 12 and the position at which seatback 14 is coupled to headrest 16, in lateral view).

In a case in which a side impact has occurred, inflator 22 actuates and airbag 30 inflates and deploys, with the inflation of airbag 30 rupturing the seatback pad and seatback surface skin of seatback 14. As shown in FIG. 2, airbag 30 inflates and deploys between occupant P and front side door 40, and protects occupant P from impact shock due to the side impact.

Figure 2:
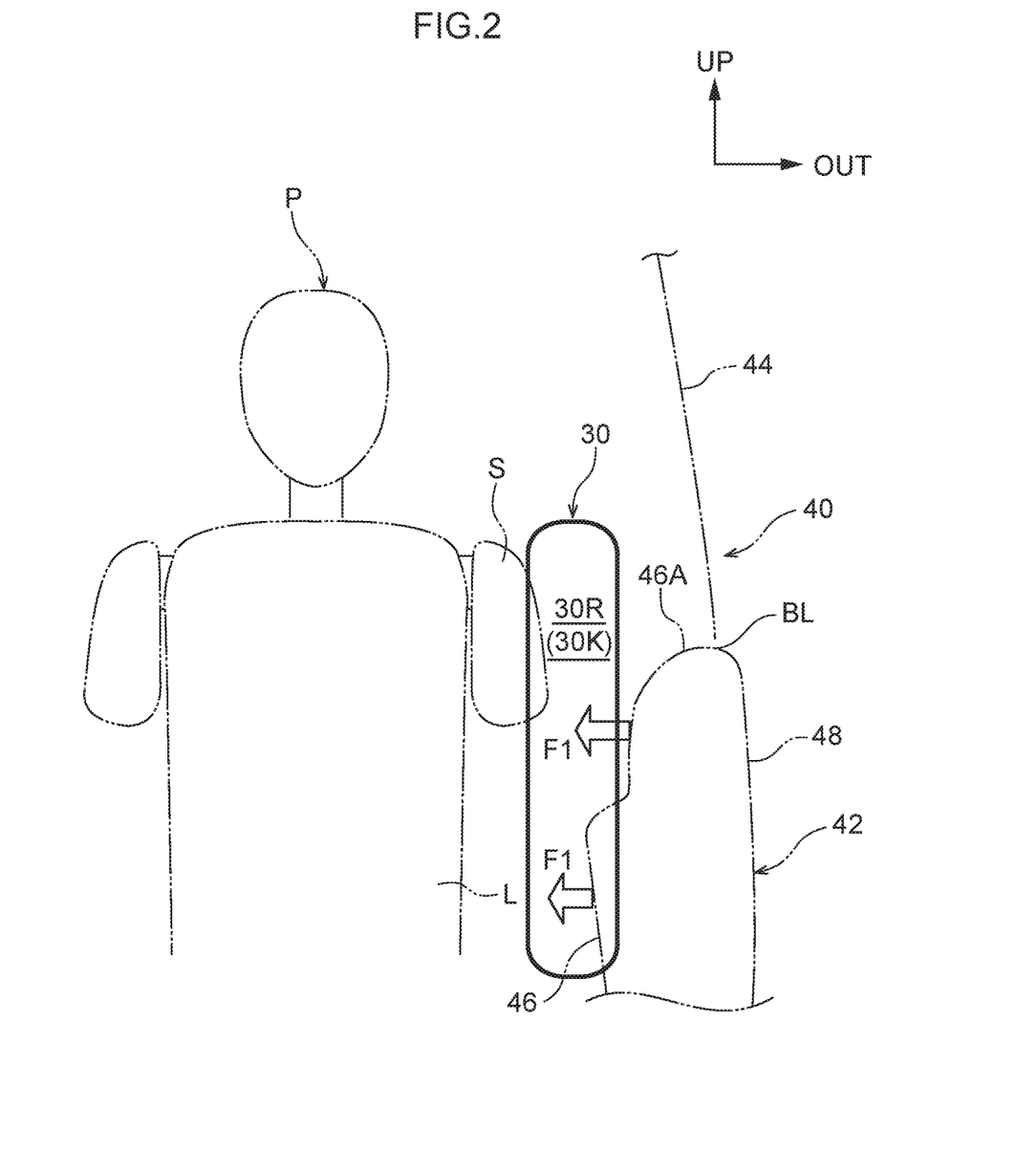
FIG. 2 is a schematic front view indicating the inflated and deployed state of the airbag according to the first exemplary embodiment.

As shown in FIG. 2, front side door 40 is provided with door main body 42, configuring the lower part thereof, and side door glass 44, configuring the upper part thereof. The boundary portion between door main body 42 and side door glass 44 (specifically, a boundary line extending along the vehicle front-rear direction) is referred to as door beltline BL. Door beltline BL is positioned lower in the vehicle than shoulder region S of occupant P seated in vehicle seat 10.

Door main body 42 is configured by door outer panel 48, which configures an outer panel of the vehicle, and door trim 46, which configures a design surface at the vehicle cabin side. Further, while not shown in the drawings, a door inner panel is provided between door outer panel 48 and door trim 46 and is joined to door outer panel 48.

A portion of a lower part of side door glass 44 is disposed inside door main body 42 via a gap between an upper end of door outer panel 48 and an upper end of door trim 46. Further, side door glass 44 extends toward substantially the top of the vehicle from the gap between the upper end of door outer panel 48 and the upper end of door trim 46.

Bulge portion 46A, which bulges toward an inner side in the vehicle width direction, is formed in the vicinity of the upper end of door trim 46. As a result, side door glass 44 is disposed so as to be recessed further toward an outer side in the vehicle width direction relative to a portion of door trim 46 that is lower than bulge portion 46A.

Next, airbag 30 is explained in detail.

It should be noted that when explaining the shape of airbag 30, the shape of airbag 30 in an inflated and deployed state is meant unless otherwise noted. Further, the shape in a case in which airbag 30 is inflated and deployed without receiving a reaction force from components configuring the vehicle, from vehicle seat 10, or from occupant P or the like (a non-restraining state) is meant, rather than a shape resulting from receipt of a reaction force from the other components or the like.

FIG. 1 is a lateral view of airbag 30. As shown in this drawing, airbag 30 has an overall shape that is vertically elongate as seen in lateral view. Airbag 30 is positioned to the side of shoulder region S, the chest region, and lumbar region L of seated occupant P, and is configured so as to restrain shoulder region S, the chest region, and lumbar region L of seated occupant P.

Airbag 30 is formed as a bag body by laying one base fabric on top of another base fabric and sewing the peripheral edge portions of the two base fabrics together. However, the bag body may be formed by folding one base fabric in half at the center thereof and sewing the peripheral edge portions together. Otherwise, the method of forming airbag 30, which is a bag body, is not particularly limited.

The interior of airbag 30 is divided (partitioned), by front-rear dividing tether 34, which serves as a "partition fabric", into two chambers: front chamber 30F and rear chamber 30R. This front-rear dividing tether 34 is formed from a similar fabric material as the base fabrics of airbag 30, which is cut into an elongate belt shape, with one lengthwise end part being sewn to one of the base fabrics of airbag 30 and the other lengthwise end part being sewn to the other base fabric of airbag 30.

Front-rear dividing tether 34 is provided with vertical extension part 34A, which extends from a central part in a front-rear direction at a bottom end of airbag 30 to a vehicle substantially upper side (an upper side of the seatback), corner part 34B, which is formed at an upper end of vertical extension part 34A and at a central part in a vertical direction of airbag 30, and inclined part 34C, which extends, from corner part 34B, forward and upward at an incline. Further, a portion immediately to the rear of inclined part 34C (specifically, a portion that is further to the front than a virtual vertical extension part in a case in which vertical extension part 34A was extended straight upward) configures a part that restrains shoulder region S of occupant P. As a result of this, rear chamber 30R expands further toward the vehicle front at a height position corresponding to shoulder region S of seated occupant P than at a height position corresponding to lumbar region L of seated occupant P. As a result, rear chamber 30R inflates and deploys to the side of shoulder region S of seated occupant P.

Inflator 22 is disposed inside rear chamber 30R, and communication hole 34H, which connects rear chamber 30R with front chamber 30F, is formed at front-rear dividing tether 34. As a result, gas generated by inflator 22 first inflates rear chamber 30R, and inflates front chamber 30F via communication hole 34H in front-rear dividing tether 34 (refer to the outlined arrow in FIG. 1). Accordingly, rear chamber 30R becomes chamber 30K having higher pressure than front chamber 30F.

Mechanism

Next, the mechanism of the present exemplary embodiment is explained.

In the present exemplary embodiment, airbag 30 is stored inside seatback 14 of vehicle seat 10. At a time of side impact, when, for example, a side impact ECU detects a side impact owing to a signal from a side impact sensor, inflator 22 is activated by this side impact ECU and airbag 30 inflates and deploys. This airbag 30 inflates and deploys between seated occupant P and side door 40.

In addition, as shown in FIG. 1, the interior of airbag 30 is partitioned into plural chambers 30F, 30R by front-rear dividing tether 34. Further, as shown in FIG. 2, among the plural chambers 30F, 30R, rear chamber 30R, which is high-pressure chamber 30K, inflates and deploys so as to vertically straddle door beltline BL as seen in vehicle lateral view. As a result, high-pressure chamber 30K receives reaction force F1 (refer to FIG. 2) from door trim 46 at a portion that is below door beltline BL. Since it has high internal pressure, high-pressure chamber 30K can easily stand upright as a result of reaction force F1 received from door trim 46. Further, shoulder region S of seated occupant P is restrained by this upright high-pressure chamber 30K.

Therefore, with the vehicle side airbag 20 according to the present exemplary embodiment, in a vehicle in which door beltline BL is lower than shoulder region S of seated occupant P, occupant shoulder region S can be appropriately restrained at a time of side impact.

Figure 4:
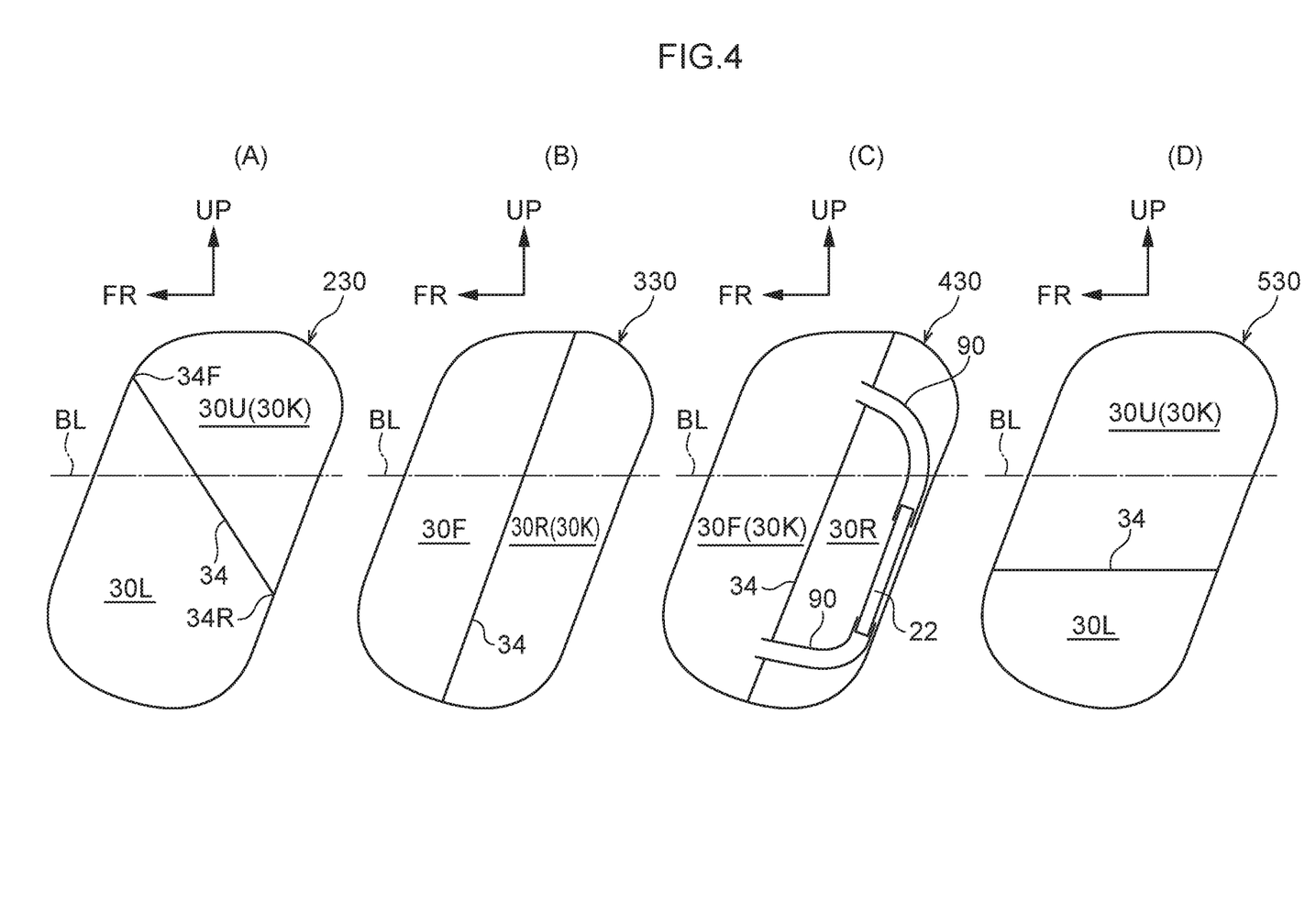
FIG. 4 is a schematic lateral view indicating inflated and deployed states of individual airbags according to other exemplary embodiments.

Further, in the present exemplary embodiment, inflator 22 is arranged inside high-pressure chamber 30K. As a result, as compared to a configuration in which gas is supplied from inflator 22 to high-pressure chamber 30 via a diffuser (see reference numeral 90 in FIG. 4(C)) or the like, high-pressure chamber 30K, which inflates and deploys so as to restrain shoulder region S of seated occupant P, inflates and deploys more promptly. As a result, occupant shoulder region S can be yet more appropriately restrained with a simple configuration.

Further, in the present exemplary embodiment, high-pressure chamber 30K is formed across a region that extends to a lower end part of airbag 30. As a result, high-pressure chamber 30K can obtain a reaction force from door trim 46 in a region that is long in a vertical direction, as a result of which high-pressure chamber 30K can easily stand upright.

Further, in the present exemplary embodiment, as shown in FIG. 1, high-pressure chamber 30K expands further toward the vehicle front at a height position corresponding to shoulder region S of seated occupant P than at a height position corresponding to lumbar region L of seated occupant P. As a result, the internal pressure of high-pressure chamber 30K can be secured without increasing the volume of high-pressure chamber 30K at a height position corresponding to lumbar region L of seated occupant P, and in addition, shoulder region S of seated occupant P can be restrained by high-pressure chamber 30K with high accuracy.

In addition, in the foregoing explanation, an example has been explained in which the interior of airbag 30 has been divided into two chambers: front chamber 30F and rear chamber 30R. However, airbag 30 may be a so-called three-chamber side airbag, as described in Japanese Patent Application Laid-open No. 2014-141159. That is, the interior of airbag 30 may be divided into a rear chamber, a front chamber, and a lower chamber by a dividing tether. In such a case, the configuration is preferably one in which the occupant shoulder region is restrained by a high-pressure rear chamber in which inflator 22 is disposed.

Second Embodiment

Figure 3:
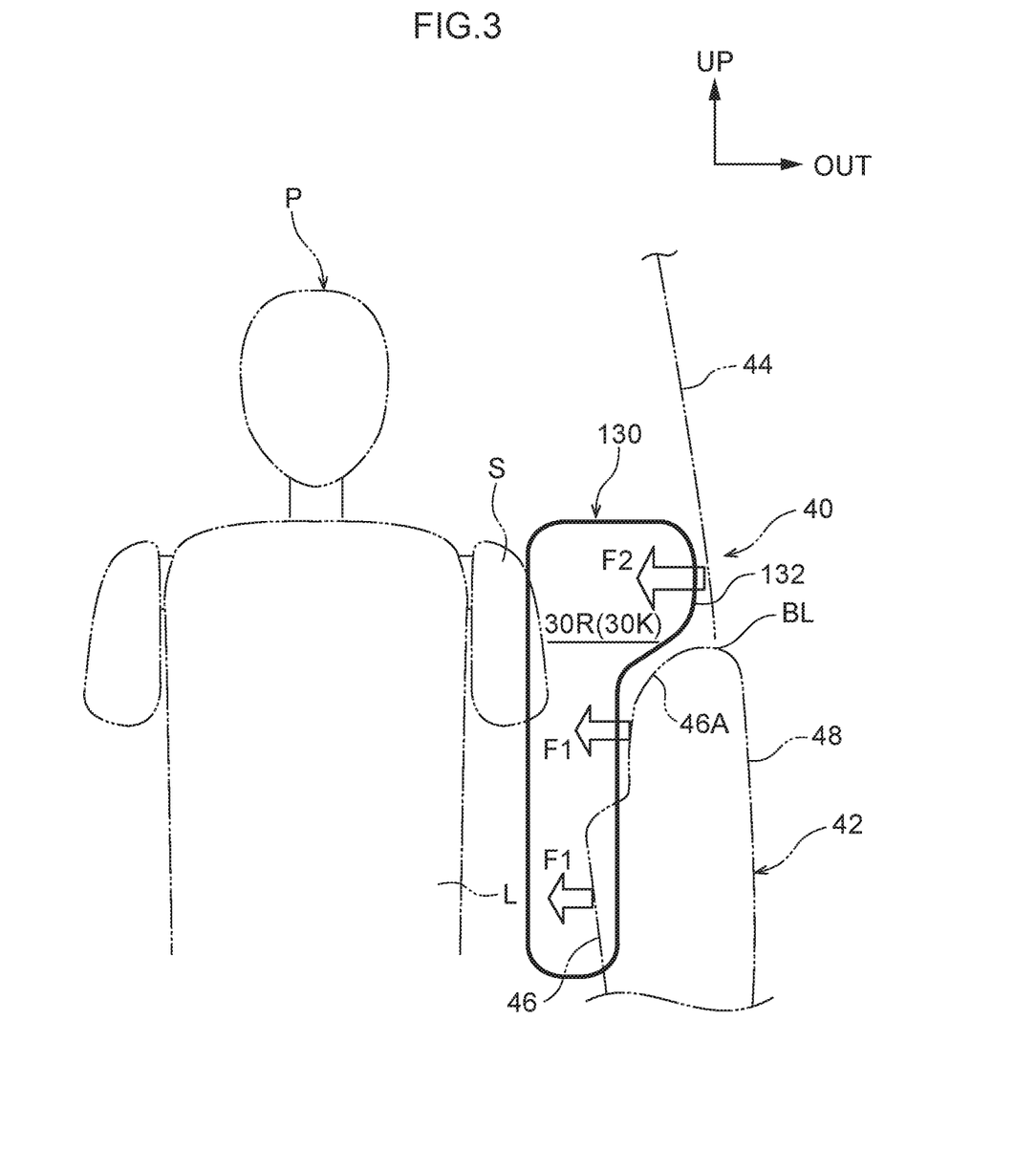
FIG. 3 is a schematic front view indicating an inflated and deployed state of an airbag according to a second exemplary embodiment.

Next, using FIG. 3, a side airbag device according to a second exemplary embodiment is explained. In addition, configurations having substantially identical functions as in the first exemplary embodiment are assigned the same reference numerals in the drawings and explanation thereof is omitted.

FIG. 3 shows airbag 130 (in a non-restraining state at a time of inflation and deployment) of a side airbag device according to the second exemplary embodiment. As shown in FIG. 3, airbag 130 has increased thickness at an outer side in the vehicle width direction at a position that restrains shoulder region S of seated occupant P. Specifically, airbag 130 has increased thickness at an outer side in the vehicle width direction, from a height position approximately corresponding to bulge portion 46A of door trim 46. That is, portion 132, which corresponds to a portion of airbag 130 that is higher than bulge portion 46A, has increased thickness at an outer side in the vehicle width direction compared to a portion of airbag 130 that is lower than bulge portion 46A.

Mechanism

Next, the mechanism of the second exemplary embodiment is explained. It should be noted that explanation of the mechanism of configuration that is similar to the first exemplary embodiment is omitted as appropriate.

In the present exemplary embodiment, airbag 130 has increased thickness at an outer side in the vehicle width direction at a position that restrains shoulder region S of seated occupant P. As a result, the portion of airbag 130 that restrains shoulder region S of seated occupant P can receive reaction force 32 directly from side door glass 44 and/or the colliding object at portion 132, which has the increased thickness.

Therefore, in addition to the mechanism explained in the first embodiment (that is, the mechanism whereby reaction force F1 is received from door trim 46 at a lower part of high-pressure rear chamber 30R, rear chamber 30R stands upright owing to reaction force F1 received from this door trim 46, and shoulder region S of seated occupant P is restrained by the upright high-pressure chamber 30K), reaction force F2 can also be obtained from side door glass 44 and/or the colliding object owing to portion 132 that has the increased thickness. As a result, shoulder region S of seated occupant P can be restrained yet more effectively in a vehicle in which door beltline BL is lower than shoulder region S of seated occupant P.

OTHER EMBODIMENTS

The chamber partition pattern inside the airbag is not limited to the first exemplary embodiment described above. For example, the configuration may be as in airbag 230, 330, 430 or 530 shown in FIG. 4. It should be noted that the communication hole in dividing tether 34 (refer to communication hole 34H in FIG. 1) and the like are not shown in the drawings in FIG. 4.

In airbag 230 shown in FIG. 4(A), dividing tether 34 extends at an incline inside airbag 230 in vehicle lateral view. Owing to dividing tether 34, the interior of airbag 230 is partitioned into upper chamber 30U and lower chamber 30L. Among these, upper chamber 30U is the high-pressure chamber 30K having higher pressure than lower chamber 30L.

Specifically, a bent part (refer to corner part 34B in FIG. 1) is not formed between front end 34F and rear end 34R of dividing tether 34, and dividing tether 34 extends in a substantially straight line in vehicle lateral view. Further, rear end 34R of dividing tether 34 is positioned further toward the bottom of the vehicle than front end 34F of dividing tether 34. Front end 34F of dividing tether 34 is positioned further toward the top of the vehicle than door beltline BL, and rear end 34R of dividing tether 34 is positioned further toward the bottom of the vehicle than door beltline BL. As a result, upper chamber 30U inflates and deploys so as to vertically straddle door beltline BL as seen in vehicle lateral view.

In airbag 330 shown in FIG. 4(B), dividing tether 34 extends inside airbag 330 in a substantially straight line in a vertical direction of seatback 14. As a result, the interior of airbag 330 is partitioned into front chamber 30F and rear chamber 30R. Of these two chambers, rear chamber 30R, in which inflator 22 is disposed, constitutes high-pressure chamber 30K. The portion of airbag 330 that restrains shoulder region S of seated occupant P is the boundary portion between front chamber 30F and rear chamber 30R (that is, the position of dividing tether 34). As a result, rear chamber 30R, which is high-pressure chamber 30K, restrains at least a portion of occupant shoulder region S.

In airbag 430 shown in FIG. 4(C), the position of dividing tether 34 is the same as in airbag 330 shown in FIG. 4(B). However, diffuser 90 is provided inside airbag 430. Gas from inflator 22 is introduced into front chamber 30F by diffuser 90. As a result, front chamber 30F constitutes high-pressure chamber 30K, which has higher pressure than rear chamber 30R. In airbag 430, too, the portion of airbag 430 that restrains shoulder region S of seated occupant P is the boundary portion between front chamber 30F and rear chamber 30R (that is, the position of dividing tether 34). As a result, front chamber 30F, which is high-pressure chamber 30K, restrains at least a portion of occupant shoulder region S.

In airbag 530 shown in FIG. 4(D), dividing tether 34 extends inside airbag 530 in a substantially straight line in the front-rear direction. As a result, airbag 530 is partitioned into upper chamber 30U and lower chamber 30L. Among these, upper chamber 30U is the high-pressure chamber 30K having higher pressure than lower chamber 30L. The entirety of dividing tether 34 is positioned lower than door beltline BL. As a result, high-pressure upper chamber 30U inflates and deploys so as to vertically straddle door beltline BL as seen in vehicle lateral view.

Supplementary Explanation of the Foregoing Exemplary Embodiments

In the foregoing exemplary embodiments, it should be noted that an example has been explained in which airbag 30 restrains shoulder region S, the chest region, and lumbar region L of seated occupant P; however, the disclosure is not limited thereto and it is sufficient if at least a region from shoulder region S to the chest region of seated occupant P is restrained.

Further, in the foregoing exemplary embodiments, a vehicle side airbag device adapted to a front seat of a vehicle has been explained; however, the device may also be applied to a rear seat.

What is claimed is:

1. A vehicle side airbag device that is stored inside a seatback of a vehicle seat, the vehicle side airbag device comprising
   an airbag that inflates and deploys between a seated occupant and a side door, an interior of the airbag being partitioned into a plurality of chambers including a high-pressure chamber, and the high-pressure chamber inflating and deploying so as to vertically straddle a door beltline as seen in vehicle lateral view and so as to restrain a shoulder region; and
   an inflator; wherein
   the interior of the airbag is partitioned into a front chamber and a rear chamber by a front-rear dividing tether, the rear chamber being the high-pressure chamber,
   the inflator is inside the high-pressure chamber,
   a communication hole connects the rear chamber with the front chamber at the front-rear dividing tether, and
   the airbag has an increased thickness toward an outer side in a vehicle width direction at a position at which the airbag restrains the shoulder region such that the airbag is asymmetrical in the vehicle width direction at the shoulder region, the shoulder region being further toward a top of the vehicle than the door beltline.

2. The vehicle side airbag device of claim 1, wherein the high-pressure chamber extends as far as a lower end part of the airbag, the lower end part being further toward a bottom of the vehicle than the door beltline.

3. The vehicle side airbag device of claim 1, wherein the high-pressure chamber expands further toward a front of the vehicle at a height corresponding to the shoulder region than at a height corresponding to a lumbar region.

4. The vehicle side airbag device of claim 2, wherein:
the front-rear dividing tether comprises
- a vertical extension part, which extends from a central part in a front-rear direction at the lower end part of the airbag toward a vehicle upper side,
- a corner part, which is formed at an upper end of the vertical extension part and at a central part in a vertical direction of the airbag, and
- an inclined part, which extends from the corner part, forward and upward at an incline, and
a portion immediately to the rear of the inclined part, which is further to the front than a virtual vertical extension of the vertical extension part extended straight upward, is configured to restrain the shoulder region.

* * * * *